(12) United States Patent
Agam et al.

(10) Patent No.: US 8,695,646 B2
(45) Date of Patent: Apr. 15, 2014

(54) SENSOR IN A DISPENSING SYSTEM FOR ACOUSTIC DETECTION OF A CONTAINER AND CONTENT THEREOF

(71) Applicant: Sensotech Inc., Montreal (CA)

(72) Inventors: Uri Agam, Quebec (CA); Pino Marcovecchio, Quebec (CA); Elad Wallach, Quebec (CA); Guy Mualem, Quebec (CA)

(73) Assignee: Sensotech Inc., Quebec (CA)

( * ) Notice: Subject to any disclaimer, the term of this patent is extended or adjusted under 35 U.S.C. 154(b) by 0 days.

(21) Appl. No.: 13/862,248

(22) Filed: Apr. 12, 2013

(65) Prior Publication Data

US 2013/0228250 A1 Sep. 5, 2013

Related U.S. Application Data (63) Continuation of application No. PCT/CA2011/001104, filed on Oct. 4, 2011.

(60) Provisional application No. 61/393,306, filed on Oct. 14, 2010, provisional application No. 61/447,837, filed on Mar. 1, 2011.

(51) Int. Cl.
*B65B 1/40* (2006.01)
*B67D 1/12* (2006.01)

(52) U.S. Cl.
CPC .................................. *B67D 1/1238* (2013.01)
USPC ............................... 141/95; 141/94; 141/198

(58) Field of Classification Search
USPC ............................................. 141/94, 95, 198
See application file for complete search history.

(56) References Cited

U.S. PATENT DOCUMENTS

| | | | |
|---|---|---|---|
| 4,437,497 A | 3/1984 | Enander | |
| 4,572,253 A | 2/1986 | Farmer et al. | |
| 4,733,381 A | 3/1988 | Farmer et al. | |
| 4,780,861 A | 10/1988 | Stembridge et al. | |
| 4,798,232 A | 1/1989 | Stembridge et al. | |
| 4,817,689 A | 4/1989 | Stembridge et al. | |
| 4,883,100 A | 11/1989 | Stembridge et al. | |
| 4,917,155 A * | 4/1990 | Koblasz et al. | 141/1 |
| 4,944,335 A | 7/1990 | Stembridge et al. | |
| RE33,435 E | 11/1990 | Koblasz et al. | |

(Continued)

OTHER PUBLICATIONS

International Search Report for Corresponding Patent Application No. PCT/CA2011/00104 Mailed Jan. 10, 2012.

(Continued)

*Primary Examiner* — Timothy L Maust
(74) *Attorney, Agent, or Firm* — Myers Wolin, LLC (57) ABSTRACT

Sensor system for acoustic detection in a dispensing system of a container having a rim and content includes at least one controller coupled to the dispensing system for selectively triggering on and off the dispensing system, an ultrasound position sensor coupled to the controller for emitting a first ultrasound beam towards a container-receiving location, for receiving ultrasound echoes indicative of a position of the container relative to a dispenser outlet, and for sending a first signal to the at least one controller indicative of the container position relative to the dispenser outlet, and an ultrasound fill sensor coupled to the at least one controller for emitting a second ultrasound beam towards the container-receiving location, for receiving ultrasound echoes indicative of the rim and content surface, and for sending to the at least one controller a second signal indicative of the position of the content surface relative to the rim.

26 Claims, 10 Drawing Sheets

(56) References Cited

U.S. PATENT DOCUMENTS

| | | | |
|---|---|---|---|
| 5,036,892 A * | 8/1991 | Stembridge et al. | 141/1 |
| 5,131,271 A | 7/1992 | Haynes et al. | |
| 5,491,333 A * | 2/1996 | Skell et al. | 250/222.1 |
| 5,573,041 A | 11/1996 | Skell et al. | |
| 6,100,518 A * | 8/2000 | Miller | 250/222.1 |
| 6,394,153 B2 | 5/2002 | Skell et al. | |
| 6,681,585 B1 | 1/2004 | Stagg et al. | |
| 6,705,356 B2 | 3/2004 | Barton et al. | |
| 6,761,284 B2 | 7/2004 | Knepler | |
| 6,789,585 B1 * | 9/2004 | Janke | 141/198 |
| 7,661,448 B2 | 2/2010 | Kim et al. | |
| 7,673,661 B2 * | 3/2010 | Chase et al. | 141/360 |
| 7,690,403 B2 * | 4/2010 | You et al. | 141/83 |
| 7,743,801 B2 * | 6/2010 | Janardhanam et al. | 141/351 |
| 8,353,321 B2 * | 1/2013 | Agam et al. | 141/198 |
| 2007/0272019 A1 | 11/2007 | Agam et al. | |
| 2008/0105331 A1 | 5/2008 | You et al. | |
| 2009/0133511 A1 | 5/2009 | Heinze et al. | |
| 2009/0183796 A1 | 7/2009 | Chase et al. | |
| 2010/0155314 A1 | 6/2010 | Lenger et al. | |
| 2010/0308073 A1 | 12/2010 | Devilbiss et al. | |

OTHER PUBLICATIONS

Written Opinion for Corresponding Patent Application No. PCT/CA2011/00104 Mailed Jan. 10, 2012.

* cited by examiner

_FIG. 5_

_FIG. 6_

SENSOR IN A DISPENSING SYSTEM FOR ACOUSTIC DETECTION OF A CONTAINER AND CONTENT THEREOF

CROSS REFERENCE TO RELATED APPLICATIONS

This is a continuation of International Application PCT/CA2011/001104, filed on Oct. 4, 2011, which claims the priority of U.S. Provisional Patent Application No. 61/393,306, filed on Oct. 14, 2010 and U.S. Provisional Patent Application No. 61/447,837, filed on Mar. 1, 2011, the contents of each of which are incorporated by reference herein.

BACKGROUND

Liquid and/or solid dispensing system for containers such as glasses or mugs have presently broad applications, including water or ice dispensers in refrigerators, soft-drink, water and ice dispensers in the fast-food industry, domestic and industrial coffee machines, etc.

Some of these dispensers are said to be automatic in that they allow preselecting a cup, glass or container size and then they fill a corresponding amount of liquid or solid (ice, etc.).

A drawback of known dispensers is that they are blind to the provided container and, therefore, cannot automatically fill any size of containers presented by a user. Another drawback is that current dispensers from the prior art do not take into account any matter that might already be present in the container prior to dispensing. The more recent one however does accurately measure the position of the container rim.

An improved sensor system for acoustic detection in a dispensing system of a container and liquid/solid mix therein is therefore desired.

SUMMARY

According to embodiments of the present invention there is provided a sensor system for acoustic detection in a dispensing system of a container having a rim and a content, the content defining a top surface in the container, the dispensing system including a container-receiving location and a dispenser outlet oriented towards the container-receiving location, the sensor system comprising:

at least one controller coupled to the dispensing system to selectively causing triggering on and off the dispensing system;

an ultrasound position sensor coupled to the at least one controller a) for emitting a first ultrasound beam towards the container-receiving location, b) for receiving ultrasound echoes indicative of a position of the container relative to the dispenser outlet, and c) for sending a first signal to the at least one controller indicative of the container position relative to the dispenser outlet; and an ultrasound fill sensor coupled to the at least one controller i) for emitting a second ultrasound beam towards the container-receiving location, ii) for receiving ultrasound echoes indicative of the rim and content surface, and iii) for sending to the at least one controller a second signal indicative of the position of the content surface relative to the rim;

whereby, in operation, the dispensing system being triggered on by the at least one controller when the first and second signals respond to respective first and second criteria and being triggered off when at least one of the first and second signals does not respond to the respective first and second criteria.

Other objects, advantages and features of the present invention will become more apparent upon reading the following non restrictive description of illustrated embodiments thereof, given by way of example only with reference to the accompanying drawings.

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

Embodiments of the present invention concern a fully automated liquid and/or solid fill sensor independent of the container configuration, shape and size, which provides the ability to fill the container with a high fill percentage.

To simplify the description, the expression liquid will be used herein to describe any matter dispensed by the dispenser, including liquid, solid, particulate matter, granular matter and/or a combination thereof.

Figure 1:
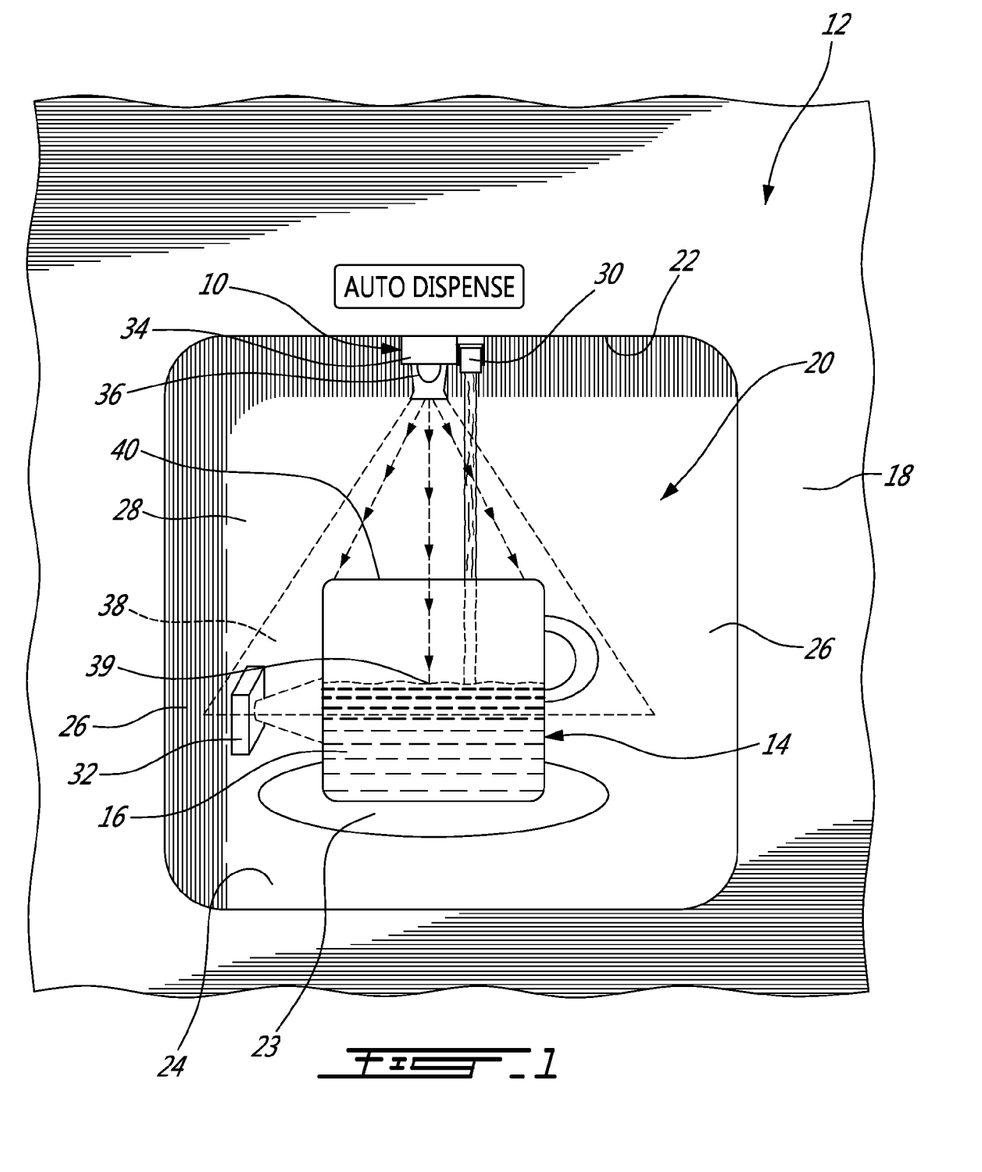
FIG. 1 is a schematic view of a sensor in a dispensing system for acoustic detection of a container and liquid therein according to a first embodiment; illustrating the use of two ultrasound sensors, one for measuring the position of the container and the other for measuring the position of the rim of the container and of the level of the liquid therein.

With reference to FIG. 1, a sensor system 10 in a dispensing system 12 for acoustic detection of a container 14 and liquid/solid 16 therein according to a first illustrative embodiment will be described.

According to this embodiment, the dispensing system 12 is in the form of refrigerator water and ice dispenser 12, the refrigerator 18 being only partially displayed.

The dispensing system 12 can take many forms but usually includes a container-receiving cavity 20 defined by top 22, bottom 24, side 26 and rear 28 walls, a dispenser outlet 30 coupled to a water supply system (not shown), and a controller (not shown). The bottom wall 24 includes a tray 23 registered with the dispenser outlet 30 that defines, with the space in the cavity 20 above the tray 23, a container-receiving location. According to some specific embodiments, the dispensing system 12 includes control buttons (not shown) to select the form (water or ice) and temperature of the water to dispense. As will become more apparent upon reading the following description of the sensor system 10, quantity selecting buttons, that can be found in most dispensing systems from the prior art, can be omitted since the control of the dispensing system 12 is automated.

It is to be noted that the sensor system 10 is not limited by the configuration and operation of the dispensing system 12 that can therefore have another form.

The sensor system 10 comprises ultrasound position and fill sensor 32 and 34.

The ultrasound position sensor 32 is mounted on one of the two lateral side walls 26 for emitting a first ultrasound beam towards the container-receiving location and for receiving ultrasound echoes indicative of the container 14 position relative to the dispenser outlet 30.

An example of a sensor 32 that can be used in the system 10 is described in United States Patent Application publication No. US-2007-0272019-A1, titled "Method and System for Short-Range Ultrasonic Location Sensing", naming Agam et al. as the inventors, which is incorporated herein by reference. Another ultrasound sensor that the one described in the previous reference can further be used.

According to a specific embodiment, the sensor 32 includes a transmitter and a receiver positioned side by side so as to yield respective transmitting and receiving beams (not shown) which overlap to define an asymmetrical shaped detection area (not shown).

According to a more specific embodiment, the sensor 32 includes at least one open collector (not shown) to be opened when the target is detected.

The at least one open collector includes for example an open collector far zone to be opened when the container 14 crosses a first limit (not shown) positioned at a first distance from the sensor 32 and an open collector near zone to be opened when the container crosses a second limit (not shown) positioned at a second distance from the sensor 32, wherein the second limit is closer to the sensor 32 than the first limit. The container 14 is detected by the sensor 32 at each one of the first and second limits by modifying the position of the detection area.

According to another embodiment, other criteria are used to determine the position of the container 14 relative to the sensor 32.

The sensor 32 is coupled to a controller (not shown) and, upon detection of the container 14 sends a signal to the dispensing system controller indicative of the container lateral position relative to the dispenser outlet 30.

The position sensor controller is programmed with the lateral distance between the dispenser outlet 30 and the mouth of the sensor 32. In the illustrated embodiment, this distance corresponds to the distance between the dispenser outlet 30 and the side wall 26. Using this distance and the measured distance/position of the container 16, the position sensor controller can determine the lateral distance between the dispenser outlet 30 and the container 16.

The ultrasound fill sensor 34 includes two ultrasound transducers (not shown) and a beam shaper 36, that can also be used as a water-protecting sleeve and is mounted adjacent the liquid dispenser 30 so as to be oriented downwardly towards the filling location 23.

One of the two transducers is configured as an ultrasound transmitter that emits a wide conical ultrasound beam 38. The beam is such that it covers the entire filing location 23.

The second transducer is configured so as to operate as a receiver which receives echoes reflected from the container 14 and liquid 16 therein.

The transducers of the ultrasound fill sensor 34 are coupled to a controller (not shown) that drives the ultrasound transducer that is used as the emitter and that interprets the signal received by the receiver. According to a most specific embodiment, the controller is configured to change the receiver amplification or the detecting threshold while the dispensing system is filling. This controller is further coupled to or alternatively part of the controller of the dispensing system 12 so as to trigger its operation depending on its detection. According to another embodiment, the controller of the position sensor 34 is the same as the controller of the position sensor 32.

Figure 2:
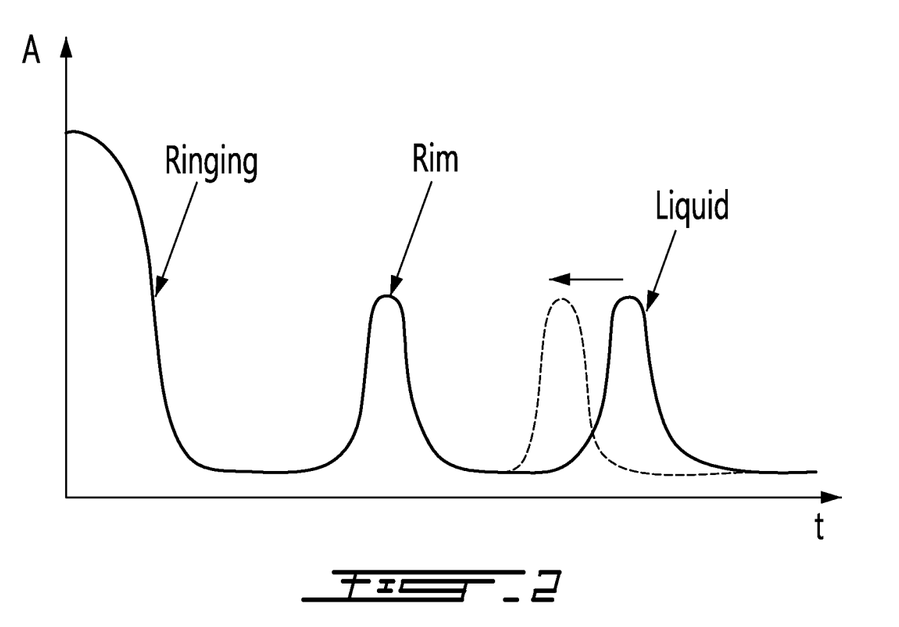
FIG. 2 is a graph showing a typical detection of the position of the rim and of the liquid level using the sensor from FIG. 1.
Figure 3:
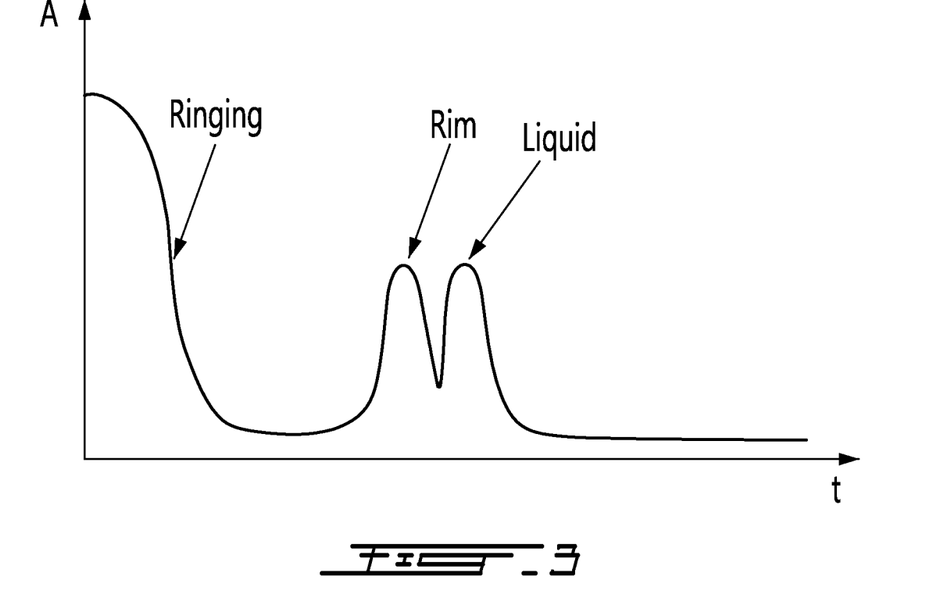
FIG. 3 is a graph similar to FIG. 2 showing, in comparison to FIG. 2, the result of shortening of the delay between the detection of the rim and of the liquid surface as the container is filled, using the sensor from FIG. 1.
Figure 4:
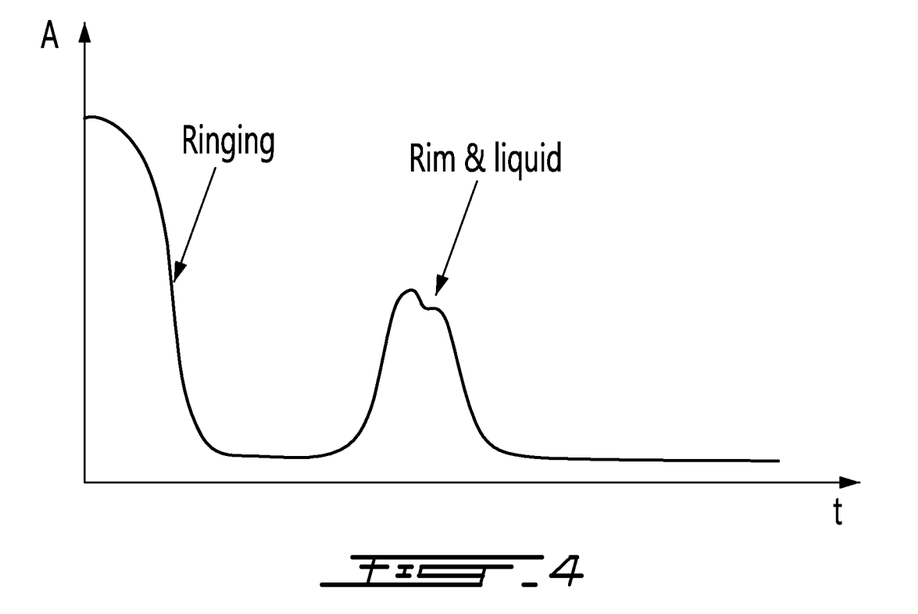
FIG. 4 is a graph similar to FIG. 3 showing, in comparison to FIG. 3, the near superimposition of the rim and liquid surface related echoes; wherein conventional systems from the prior art do not allow resolving between the two.

FIGS. 2 to 4 are graphs showing typical signals which are indicative of the echoes detected by the second transducer (receiver). These graphs show that, as time passes (from FIG. 2 to FIG. 4), the second echo (defined as liquid'), which corresponds to the surface 39 of the liquid 16, approaches the first echo, which corresponds to the rim 40 of the container 14. The use of separate transducers for receiving and transmitting allows accounting for a potential short distance between the transducers and the container rim 40.

The controller of the fill sensor 34 can further be programmed to change sensor amplification, excitation intensity, threshold level and to predict the time that the container 14 will be full, providing the filling rate of liquid dispensing as calculated and extrapolated. As a person skilled in the art will now appreciate, it is not required that the rate of filling is not necessarily provided to the sensor controller which can determine it following measurements of successive positions of the surface of the liquid over time. Using this filling rate, the sensor controller may be programmed to activate the transducers more frequently or only at the time it expects the liquid to reach near the rim 40.

When the sensor 10 detects that the liquid surface 39 of the liquid 16 has reached the rim 28 minus a preprogrammed gap, the sensor controller sends a signal to the dispensing system 12 to stop dispensing liquid.

According to a further embodiment of a sensor for acoustic detection of a container and content thereof (not shown), the water-resistant beam shaper (sleeve) is replaced by another sleeve or casing or is omitted, depending, for example, on the application, or the required beam size.

According to still another embodiment (not shown), the sensor includes a single transducer which is operated by the sensor controller to alternatively act as an ultrasound emitter and detector. The single transducer configuration is effective when the distance between the transducer and the container is sufficient to allow the excitation 'ringing' to decay.

In operation, the position sensor controller or the dispensing controller activates the fill sensor 34 via its controller so it can determine the distance between the rim 40 and the liquid/solid level 26. If the container 16 is registered with the dispenser outlet 30 or, according to a further embodiment if it receives a signal to that effect from the controller of the sensor 32, and if the distance between the rim 40 and the top surface of the liquid is not within a predetermined range, then the valve or any other mechanism allowing dispensing of the liquid through the outlet 30 is opened. The valve remains open whenever both criteria are true.

The position sensor 32 may further be used to determine additional criteria to prevent dispensing when one moves the container from its position, or if the container 14 is not stable.

A person skilled in the art will now appreciate that any one of the dispensing system controller and the controller(s) of the sensor system 10 can be used to trigger the operation of the fill sensor 34 and/or dispensing of liquid upon receipt of signal from the position sensor 32 indicative that the container 14 is correctly positioned for filling.

According to still another embodiment, the fill sensor 34 is further used to detect movement of the container 14. The dispensing system 12 is then programmed to stop dispensing upon such detection. According to this further embodiment, the fill sensor 34 is used to detect the position of the container 14 relative to the dispenser outlet 30. One or more of the following criteria can be used to trigger safe dispensing when the sensor 34 is used: container position, rim detection, rim minimum height, container bottom position, measurement of filling when dispensing, etc.

Figure 5:
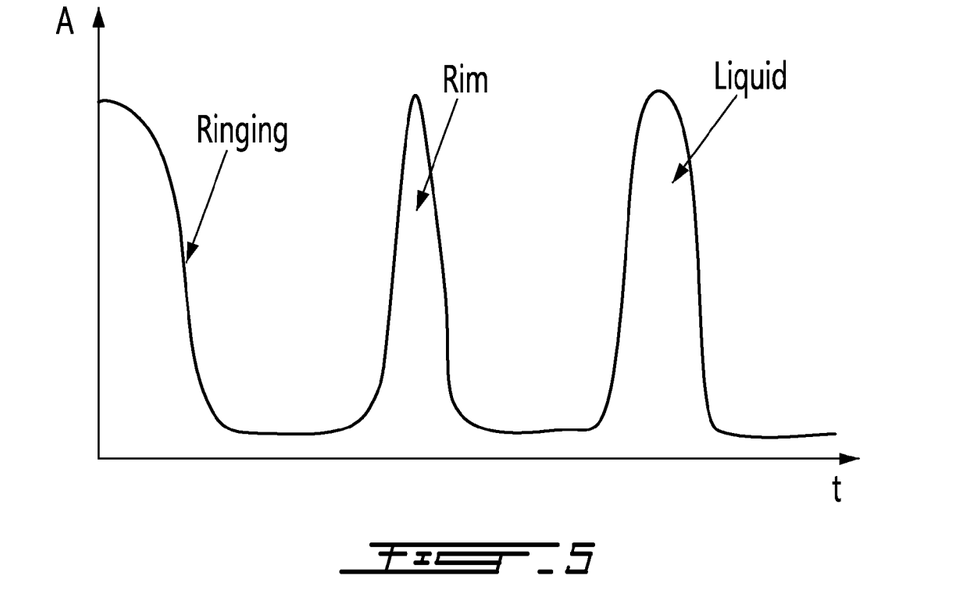
FIG. 5 is a graph showing the amplitude over time of the signal indicative of the echoes of the liquid and rim in and of a container, illustrating that the rim signal can block the liquid signal when the container is offset relative to the dispenser and sensor.
Figure 6:
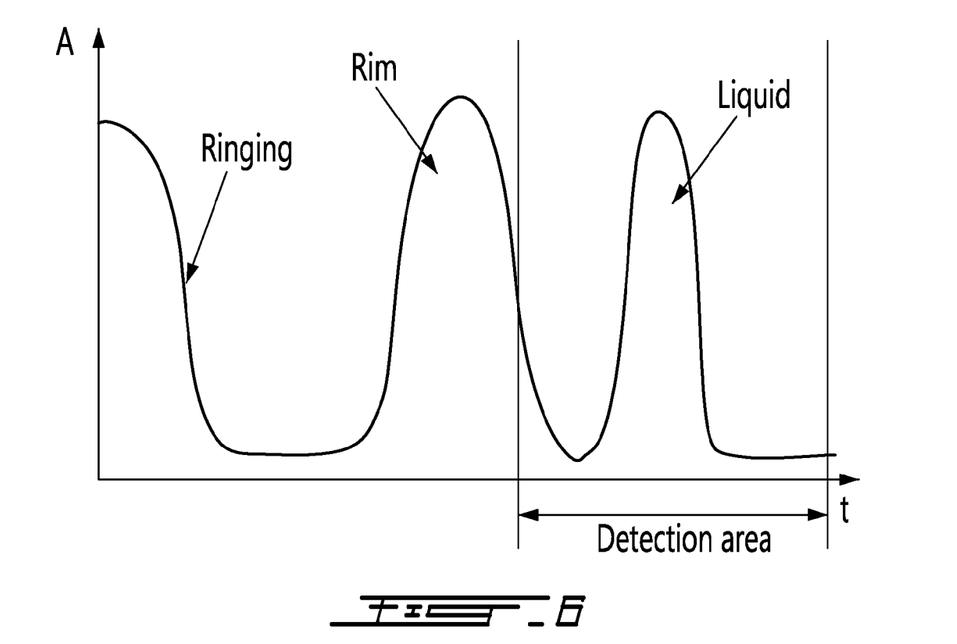
FIG. 6 is a graph similar to FIG. 5, showing that the detection location of the maximum fill level is established by the situation depicted in FIG. 5.

When the container 14 is so offset relative to the dispenser outlet 30 that the rim 40 is closer to the dispenser outlet 30 and sensor 32 than the center of the container 14, then the rim signal can block the liquid signal as can be seen in FIG. 5. This results in a narrow/limited detection area as illustrated in FIG. 6.

Generally stated, the use of the position sensor 32 allows the system 10 to know at all time whether the container 14 is at the right position. It further allows higher accuracy when the container is being moved. This arrangement can be applied irrespective of the fill sensor configuration.

An adaptive threshold method such as described in the U.S. Pat. No. 7,130,244 B2 issued to Gal et al. on Oct. 31, 2006 and titled "Device and Method for Adaptive Ultrasound Sensing", which is incorporated herein by reference, is further used to separate the rim signal and the liquid signal. Such adaptive method is applied "on the fly" during the fill of the container, i.e. that the threshold is re-evaluated while the rim position is established and as the liquid fills the container.

More specifically, the adaptive threshold method includes a) receiving an echo value e(i) from a number I of sensing positions i along the scanning direction and b) comparing each echo value e(i) to a detection threshold dt(i) associated to the sensing position (i). A detection occurs when the echo value e(i) is greater than the detection threshold dt(i). The detection thresholds dt(i) is revaluated over time to cope for environment changes at the sensing position (i) corresponding to the detection thresholds dt(i).

According to another embodiment, another method is used to evaluate the detection threshold.

Another method that can be used for the separation of the rim and liquid signals is a change of amplification whereby the signature size of the container rim 40 is minimized. Such a method is adapted for the amplitude of the detected echoes. This method of separation between the rim and liquid signals and the adaptive threshold method may be used together or separately.

Figure 9:
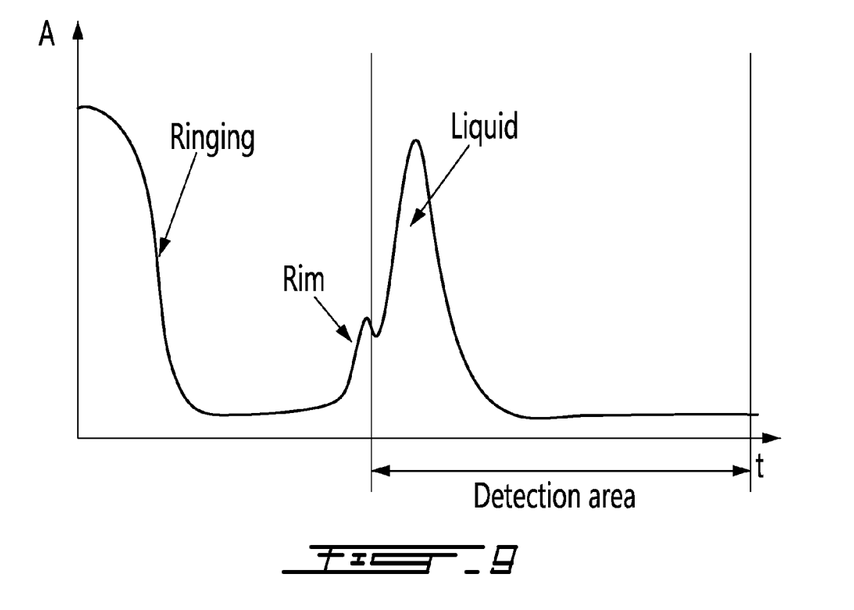
FIG. 9 is a graph showing the maximum level that can be resolved using dynamic amplification and dynamic threshold methods

FIG. 9 shows the maximum level that can be resolved using dynamic amplification, threshold methods, or both. Theoretically, when the position of the shortest distance to the rim is established using the side sensor 29 and the container does not move, the above described methods allow filling the container to the maximum, i.e. up to the lips of the container.

According to still another embodiment, a preset adaptive threshold that is initially set is changed as the liquid continues to fill the container and as its signal increases. In summary, in operation of the system, the use of the adaptive threshold technique is either dynamic, i.e. that it can be changed as the liquid fills the container, or based on the liquid signal amplitude, or stable, i.e. that no change occurs in the level.

Figure 7:
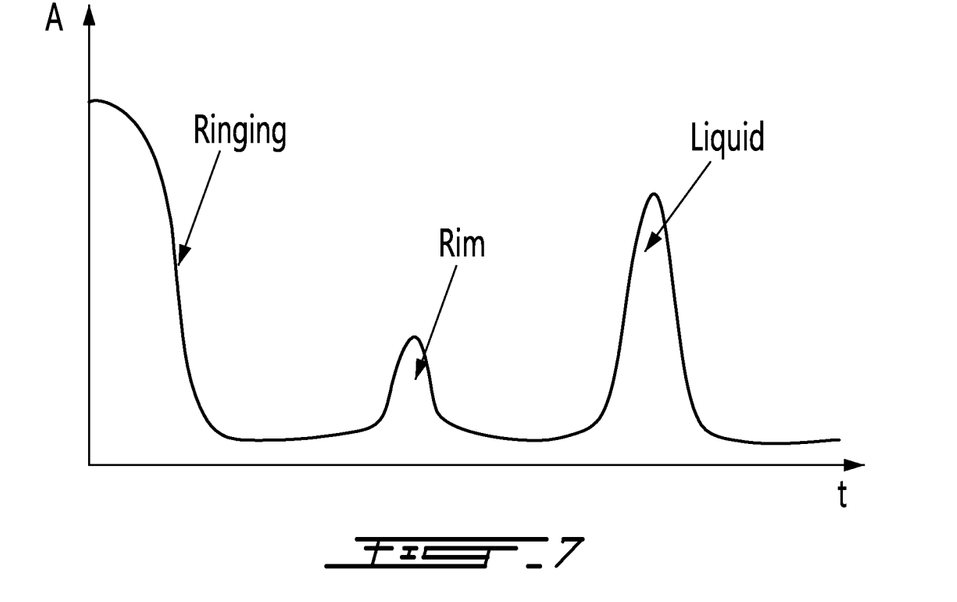
FIG. 7 is a graph similar to FIG. 5, wherein an adaptive amplification method has been applied on the amplitude, resulting in a lower rim signal relative to the liquid signal compared to FIG. 5.

Examples of resulted signals are shown in FIG. 7, which can be compared to FIGS. 3 and 4, wherein, by reducing the amplification, the liquid surface signal and the rim signal are separated.

According to another embodiment, a different adaptive method than the one described hereinabove is used to separate the rim signal and the liquid signal.

Figure 8:
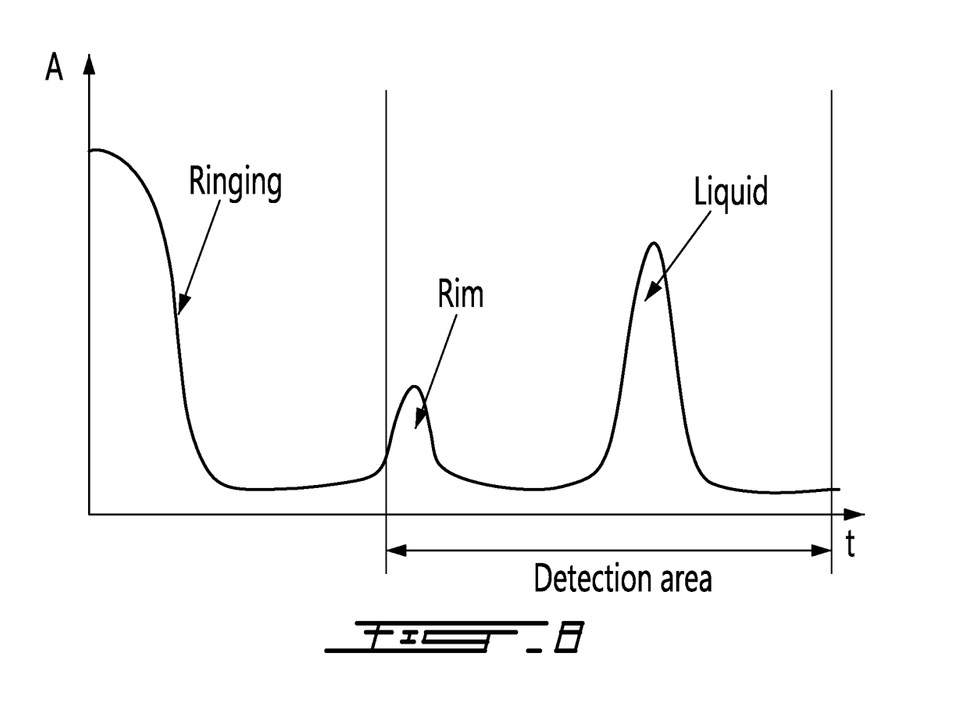
FIG. 8 is a graph similar to FIG. 7, showing that the detection location of the maximum fill is no longer limited by the rim signal as depicted in FIG. 5.

According to still another embodiment, the rim position is first established (see FIG. 8) and then only the liquid level is measured (this can be done by reduction of amplification when the liquid fills the container) until the preset point in reference to the container rim established previously is reached. According to such a method, it is assumed that the container has not been moved during its filling.

According to another embodiment, the sensor 32 provided on the side to automatically detect the position of the container 14 is used to force the user to position the container centered with the dispenser in order to start dispensing of the liquid, so as to render useless providing further correcting electronics and algorithms. The system can be further configured to generate a visual signal such as a green light or a sound signal in order to provide feedback to the user indicative of the correctness of the container position.

Figure 10:
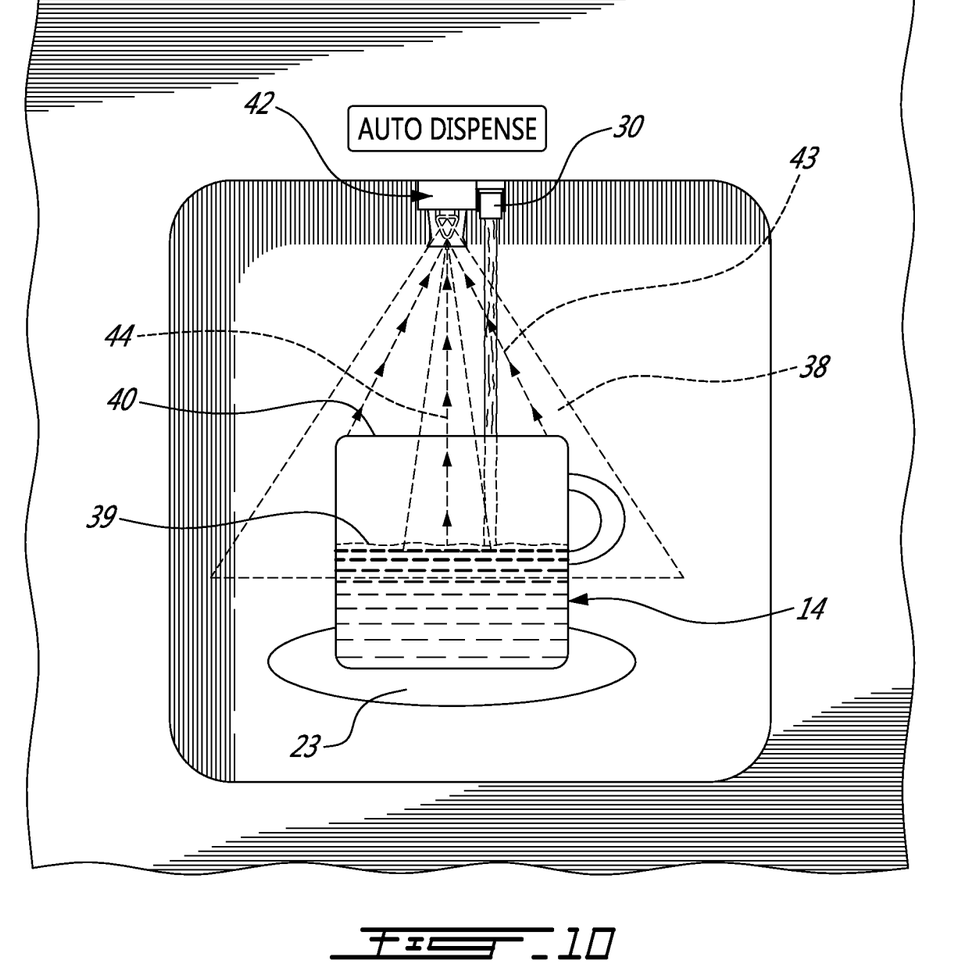
FIG. 10 is a schematic view of a sensor in a dispensing system for acoustic detection of a container and liquid therein according to a second embodiment, illustrating the use of three transducers, one emitting a wide detecting beam, one receiver for the rim of the container and one receiver for the liquid only therein.

Turning now to FIG. 10, an ultrasound fill sensor 42 in a dispensing system 12 for acoustic detection of a container 14 and liquid 16 therein according to a second illustrative embodiment will now be described. Since the sensor 42 is similar to the sensor 34, and for concision purposes, only the differences between the two sensors 42 and 34 will be described herein.

The sensor 42 comprises three ultrasound transducers (not shown).

A first transducer is configured so as to operate as an ultrasound transmitter that emits a wide conical ultrasound beam 38. The beam is such that it covers the entire filing location 23.

A second transducer is configured so as to operate as a wide area detector which receives echoes reflected from both the container 14 and liquid 16 (see lines 43). The third transducer is configured so as to operate as a narrow area detector which receives echoes reflected from around the center of the location 23 and is targeted to the liquid 16 (see line 44).

Figure 11:
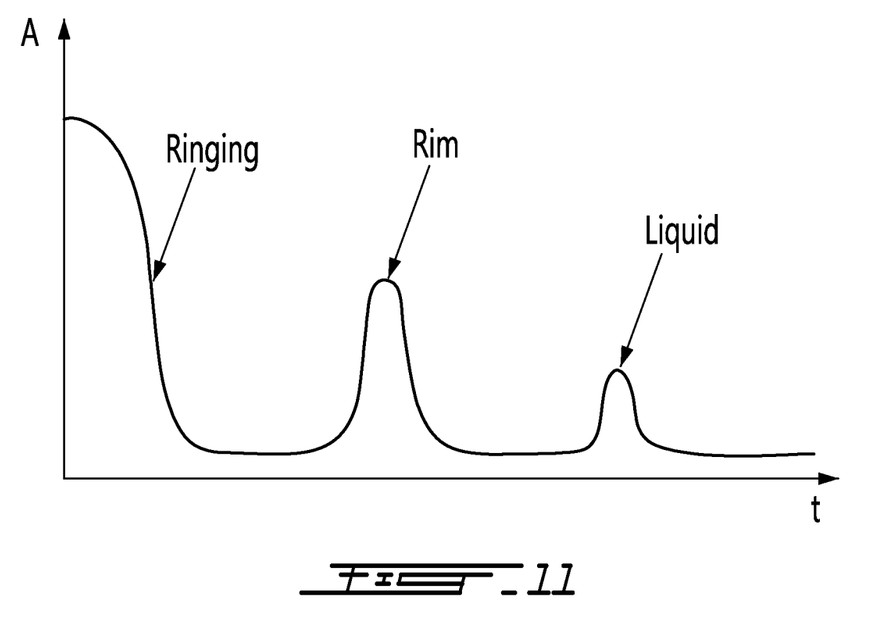
FIG. 11 is a graph showing the detection of the rim and of the liquid level by the wide angle receiver from the sensor of FIG. 10.
Figure 12:
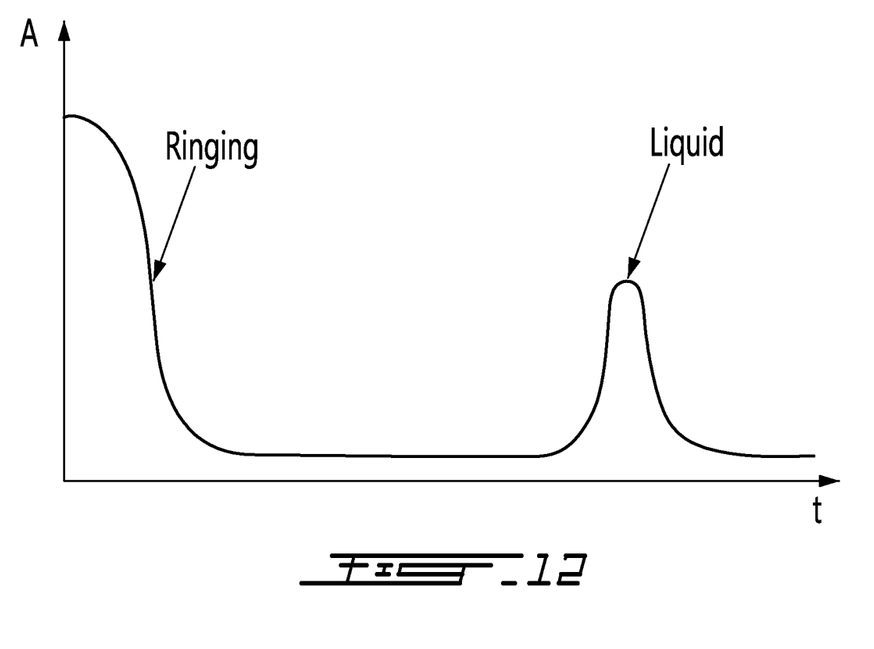
FIG. 12 is a graph showing the detection of liquid only by the narrow angle receiver from the sensor of FIG. 10.

FIGS. 11 and 12 are graphs showing the shapes of the signals indicative of the echoes detected by the second and third transducers respectively.

Comparing the two graphs, one can see that the signal indicative of the liquid surface 39 is more intense in FIG. 12 as a result of its detection by the narrow beam. Such a narrower beam therefore yields more precise measurements of the liquid level.

According to another embodiment of a sensor including three transducers (not shown), two transducers are used as ultrasounds emitters and the third transducer is used as a receiver. When the third transducer acts as an ultrasound emitter, the wide angle receiver receives only reflections from the liquid and, therefore, if the emitters operate in sequence, the receiver will see the first sequences both reflections from the rim and from the liquid and, in the other sequences only reflection from the liquid. Both readings can be compared without interference.

Figure 13:
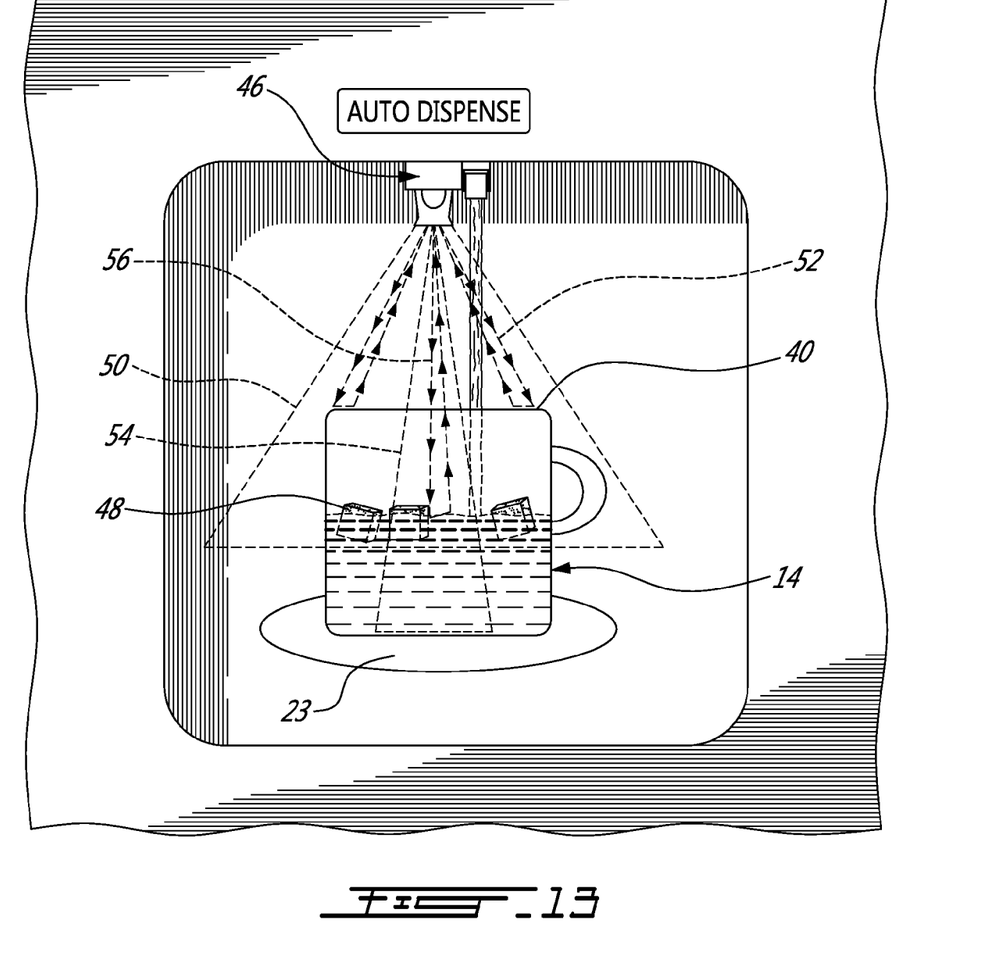
FIG. 13 is a schematic view of a sensor in a dispensing system for acoustic detection of a container and liquid therein according to a third embodiment, illustrating the use of four transducers, one emitting a wide detecting beam, one wide-angle receiver for the rim of the container, one emitting a narrow detecting beam and one narrow-angle receiver for the liquid therein.

FIG. 13 shows a sensor 46 in a dispensing system 12 for acoustic detection of a container 14 and liquid/solid 16 therein according to a third embodiment. Since the sensor 46 is similar to the sensor 42, and, for concision purposes, only the differences between the two sensors 46 and 42 will be described herein.

The sensor 46 comprises four ultrasound transducers. This embodiment can be used for example to improve the separation between the measurements of the liquid/solid level 48 and the position of the rim 40.

A first transducer is operated as an ultrasound transmitter that emits a wide conical ultrasound beam 50. The beam is such that it covers the entire filing location 23.

A second transducer is configured so as to operate as a wide area detector which receives echoes reflected from both the container 14 and liquid 16 (see lines 52).

The third transducer is configured so as to operate as a narrow area emitter that emits a narrow conical ultrasound beam 54 aimed at the center of the filing location 23.

The fourth detector is configured so as to operate as a receiver within a narrow area so as to receive echoes reflected from the center of the location 23 and targeted to the liquid 16 (see line 56).

Figure 14:
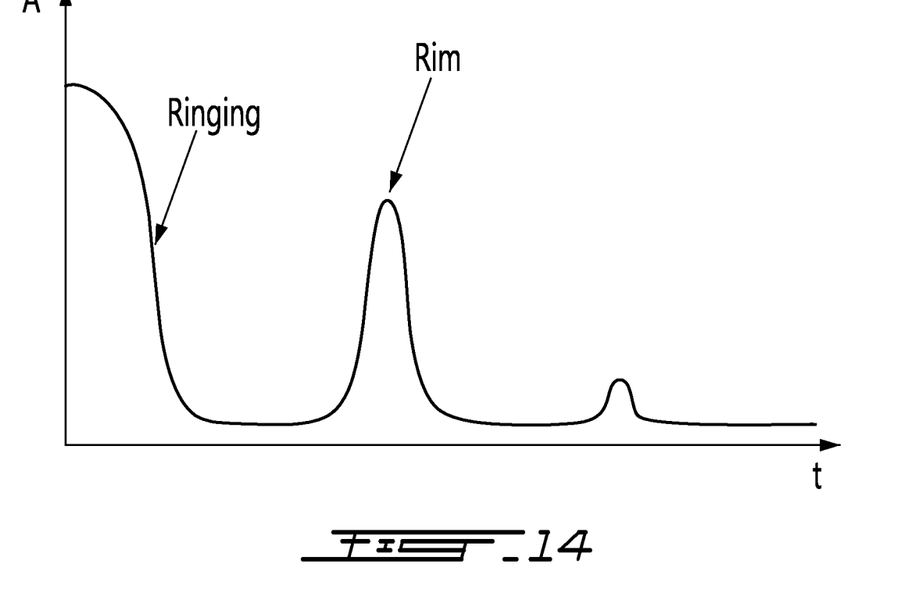
FIG. 14 is a graph showing the detection of the rim and of the liquid surface by the wide angle receiver from the sensor of FIG. 13.
Figure 15:
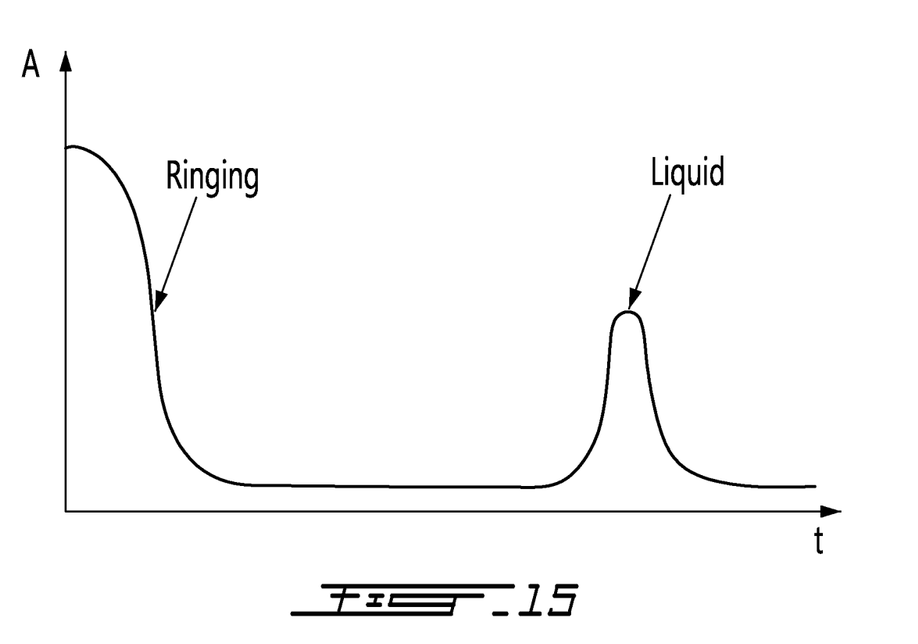
FIG. 15 is a graph showing the detection of the liquid surface only, by the narrow angle receiver from the sensor of FIG. 13.

FIGS. 14 and 15 are graphs showing the shape of the signals indicative of the echoes detected by the second and fourth transducers respectively.

Providing at least two transducers adjacent the dispenser and above the container allows for the system to detect the level of the liquid in a container while it is dispensed therein, and this for containers of various heights including those wherein the rim is very close to the dispenser.

It is to be noted that many modifications could be made to the embodiments of a sensor system in a dispensing system for acoustic detection of a container and liquid/solid as described hereinabove. For example:
  the dispenser system that includes the ultrasound sensor system can be configured or programmed so as to stop dispensing when no change in the liquid level is detected;
  even though the above embodiments of sensors for acoustic detection of a container and liquid/solid therein have been described has being part of a refrigerator water and ice dispensing system, they are not limited to such an application and they can be installed and used independently of any dispensing system, such as, without limitations, coffee and soft drink distributing machines;
  embodiments of the present sensor system can be used to detect the filing of any solid, particulate matter, granular, liquid or a mixture thereof in any type of container having any size and shape that is provided with a rim or collar. Examples include, without limitation, filling sand in a pouch, coffee in a mug, gasoline in an open top barrel, etc.
  the dispensing system and the sensor system can include any number of controllers for controlling the operation thereof. For example a single controller can be provided that controls the operations of the dispensing system, and of both the fill and position sensors. According to another embodiment, two controllers are used: a first one for the dispensing system and a second one, coupled to the first one, for the fill and position sensors. Also, each of the dispensing system and two sensors can have a dedicated controller or more than one each dedicated to specific function(s) of the dispensing system or sensor systems;
  the detecting beams produced by the sensor system are not limited to the conical shape;
  in embodiments wherein the dispenser system is used to dispense carbonate water or liquid, such as soft drink or beer, the sensor system can be configured to stop dispensing and wait a certain time for the reappearance of the liquid signal following its disappearance. This can occur when foam forms on top of the liquid. Such a test can be implemented in any other application;

Although the present invention has been described hereinabove by way of illustrated embodiments thereof, it can be modified, without departing from the spirit and nature of the subject invention as defined in the appended claims.

The invention claimed is:

1. A sensor system for acoustic detection in a dispensing system of a container having a rim and a content, the content defining a top surface in the container, the dispensing system including a container-receiving location and a dispenser outlet oriented towards the container-receiving location, the sensor system comprising:
  at least one controller coupled to the dispensing system for selectively causing triggering on and off the dispensing system;
  an ultrasound position sensor coupled to the at least one controller a) for emitting a first ultrasound beam towards the container-receiving location, b) for receiving ultrasound echoes indicative of a position of the container relative to the dispenser outlet, and c) for sending a first signal to the at least one controller indicative of the container position relative to the dispenser outlet; and an ultrasound fill sensor coupled to the at least one controller i) for emitting a second ultrasound beam towards the container-receiving location, ii) for receiving ultrasound echoes indicative of the rim and content surface, and iii) for sending to the at least one controller a second signal indicative of the position of the content surface relative to the rim;

whereby, in operation, the dispensing system being triggered on by the at least one controller when the first and second signals respond to respective first and second criteria and being triggered off when at least one of the first and second signals does not respond to the respective first and second criteria.

2. The sensor system of claim 1, wherein the ultrasound fill sensor is positioned adjacent the dispenser outlet.

3. The sensor system of claim 1, wherein the ultrasound fill sensor includes at least one ultrasound emitter and at least one ultrasound receiver.

4. The sensor system of claim 3, wherein the at least one ultrasound emitter includes a first ultrasound emitter for emitting a wide ultrasound beam which substantially covers the detection location.

5. The sensor system of claim 4, wherein the at least one ultrasound receiver is configured for receiving echoes reflected from the entire detection location.

6. The sensor system of claim 1, wherein the at least one controller is configured for at least one of i) changing at least one characteristic of the fill sensor, the at least one characteristic being selected from the group consisting of amplification, excitation intensity, threshold level and ii) predicting a time when the container will be full.

7. The sensor system of claim 6, wherein a rate of filling the container is used by the at least one controller for predicting a time when the container will be full.

8. The sensor system of claim 6, wherein a frequency of activation of the fill sensor depends on the predicted time when the container will be full.

9. The sensor system of claim 1, wherein an adaptive threshold method is used to determine at least one of the rim and content surface positions.

10. The sensor system of claim 1, wherein the at least one controller modifies the amplification of the second signal to determine the position of the content surface relative to the rim.

11. The sensor system of claim 10, wherein an adaptive threshold method is further used to determine at least one of the rim and content surface position.

12. The sensor system of claim 1, wherein the at least one controller is configured for triggering off the dispensing system when the second signal remains within a predetermined range over a predetermined time.

13. The sensor system of claim 1, wherein the first criteria includes the position of the container relative to the dispenser outlet being within a specified location within the container-receiving location.

14. The sensor system of claim 1, wherein the position sensor is further provided d) for detecting movement of the container during operation of the dispensing system and for sending a third signal to the at least one controller indicative of the container being moved; the at least one controller being configured to triggering off the dispensing system upon receipt of the third signal.

15. The sensor system of claim 1, wherein the at least one controller includes at least one of a dispenser controller coupled to the dispenser system, an ultrasound position sensor controller coupled to both the dispenser controller and to the ultrasound position sensor, and an ultrasound fill sensor controller coupled to both the dispenser controller and to the ultrasound fill sensor.

16. The sensor system of claim 1, wherein the ultrasound position sensor includes ultrasound emitter and receiver so positioned side by side as to yield transmitting and receiving beams which overlap to define an asymmetrical shaped detection area.

17. The sensor system of claim 16, wherein the at least one controller is configured with open collector far and near zones to be opened when the container crosses respective first or second distance within the detection location; the position of the container being determined by the at least one controller using said first and second distance.

18. The sensor system of claim 1, wherein at least one of the first and second ultrasound beams is conical.

19. The sensor system of claim 1, wherein the content includes at least one of a liquid, solid, particulate matter and granular matter.

20. The sensor system of claim 19, wherein the dispensing system is part of a machine selected from the group consisting of a refrigerator, a coffee machine, and a soft drink dispensing machine.

21. The sensor system of claim 1, wherein the fill sensor includes a beam shaper.

22. The sensor system of claim 21, wherein the beam shaper is configured to further act as a liquid protective sleeve.

23. The sensor system of claim 1, wherein the ultrasound position sensor is positioned for emitting the first ultrasound beam from the side relative to the dispensing outlet and generally perpendicular from the second ultrasound beam.

24. A sensor system for acoustic detection in a dispensing system of a container having a rim and a content, the content defining a top surface in the container, the dispensing system including a container-receiving location and a dispenser outlet oriented towards the container-receiving location, the sensor system comprising:

at least one controller coupled to the dispensing system to for selectively causing triggering on and off the dispensing system;

an ultrasound position sensor coupled to the at least one controller a) for emitting a first ultrasound beam towards the container-receiving location, b) for receiving ultrasound echoes indicative of a position of the container relative to the dispenser outlet, and c) for sending a first signal to the at least one controller indicative of the container position relative to the dispenser outlet; and an ultrasound fill sensor coupled to the at least one controller i) for emitting a second ultrasound beam towards the container-receiving location, ii) for receiving ultrasound echoes indicative of the rim and content surface, and iii) for sending to the at least one controller a second signal indicative of the position of the content surface relative to the rim;

whereby, in operation, the dispensing system being triggered on by the at least one controller when the first and second signals respond to respective first and second criteria and being triggered off when at least one of the first and second signals does not respond to the respective first and second criteria;

wherein the ultrasound fill sensor includes at least one ultrasound emitter and at least one ultrasound receiver; the at least one ultrasound emitter including a first ultrasound emitter for emitting a wide ultrasound beam which substantially covers the detection location; the at least one ultrasound receiver being configured for receiving echoes reflected from the entire detection location; the at least one ultrasound receiver including a wide area receiver for receiving echoes reflected from the entire detection location and a narrow area receiver for receiving echoes reflected from only the center of the detection location.

25. The sensor system of claim 24, wherein the at least one ultrasound emitter includes a second ultrasound emitter for emitting a narrow ultrasound beam which covers only the center of the detection location.

26. A sensor system for acoustic detection in a dispensing system of a container having a rim and a content, the content defining a top surface in the container, the dispensing system including a container-receiving location and a dispenser outlet oriented towards the container-receiving location, the sensor system comprising:
- at least one controller coupled to the dispensing system to for selectively causing triggering on and off the dispensing system;
- an ultrasound position sensor coupled to the at least one controller a) for emitting a first ultrasound beam towards the container-receiving location, b) for receiving ultrasound echoes indicative of a position of the container relative to the dispenser outlet, and c) for sending a first signal to the at least one controller indicative of the container position relative to the dispenser outlet; and
- an ultrasound fill sensor coupled to the at least one controller i) for emitting a second ultrasound beam towards the container-receiving location, ii) for receiving ultrasound echoes indicative of the rim and content surface, and iii) for sending to the at least one controller a second signal indicative of the position of the content surface relative to the rim;
- whereby, in operation, the dispensing system being triggered on by the at least one controller when the first and second signals respond to respective first and second criteria and being triggered off when at least one of the first and second signals does not respond to the respective first and second criteria;
- wherein the ultrasound fill sensor including at least one ultrasound emitter and at least one ultrasound receiver; the at least one ultrasound emitter including a first ultrasound emitter for emitting a wide ultrasound beam which substantially covers the detection location and a second ultrasound emitter for emitting a narrow ultrasound beam which covers only a center of the detection location; the at least one ultrasound receiver being configured for receiving echoes reflected from the entire detection location.

* * * * *